Sept. 30, 1952 R. C. ANDERSEN 2,612,580
WELDING METHOD AND APPARATUS
Filed April 29, 1949 2 SHEETS—SHEET 1

INVENTOR.
Raymond C. Andersen
BY
Moore, Olson & Trexler
attys.

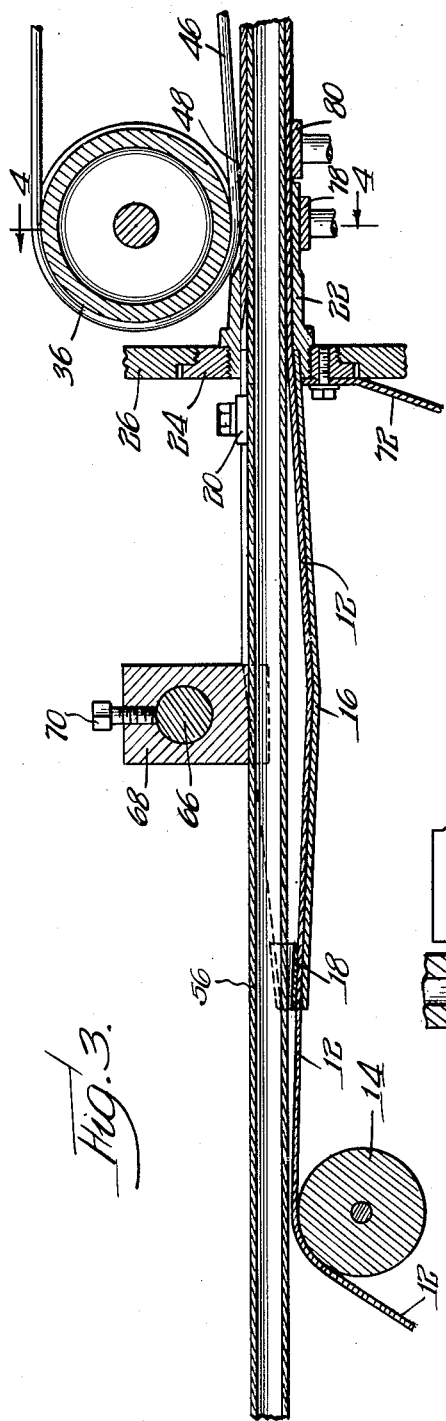

Patented Sept. 30, 1952

2,612,580

UNITED STATES PATENT OFFICE 2,612,580

WELDING METHOD AND APPARATUS

Raymond C. Andersen, Lombard, Ill., assignor to Chicago Metal Hose Corporation, Maywood, Ill., a corporation of Illinois Application April 29, 1949, Serial No. 90,339

10 Claims. (Cl. 219—6)

This invention relates to welding methods and apparatus and more particularly to the welding of tubing or the like.

In welding tubing having an overlapping seam it is important in the formation of a good weld to produce an optimum current density at the point of welding. The current density obtained at the point of welding depends upon the total welding current and the shape and area of the electrode faces. For any given shape and size of electrode face it is possible to adjust the welding current to produce the optimum welding conditions at the point of weld. However, the shape or contour of the electrode face changes upon the continued application of pressure and the application of heat from the welding current. Heretofore in order to maintain the optimum current density at the point of weld, it has been necessary to adjust the welding current as the electrode contour changed or to frequently dress the electrode welding face. Both of these expedients have been found to be unsatisfactory for the first is difficult to achieve and the second is expensive.

To overcome these difficulties the present invention contemplates providing an electrode face which may be continuously renewed as the welding operation progresses.

It is an object of the invention to provide an improved welding method and apparatus for welding materials by the electrical resistance welding method, which method and apparatus are particularly suited for the production of tubing from strip material.

More particularly, it is an object of the invention to provide an improved welding method and apparatus of the type above defined which embodies an improved welding electrode structure.

A further object of the invention is to provide continuously operable welding methods and means in which the welding electrodes continuously present a uniform current carrying face to the material being welded.

Another object of the invention is to provide in welding methods and apparatus of the type described an improved form of electrode construction in which the portion of the electrode contacting the material being welded is continuously renewed.

A still further object of the invention is to provide a welding method and apparatus of the type described which have improved operating characteristics and which provide continuously operable methods and means for welding materials on a production scale with a minimum of maintenance and repair.

Still other objects and advantages of the invention will appear from the following specification when taken in connection with the accompanying drawings, wherein a preferred embodiment is illustrated.

In the drawings, wherein like reference numerals refer to like parts throughout:

Figure 3 is a partial enlarged view in cross section as seen in the direction of the arrows on the line 3—3 of Figure 2;

Figure 4 is an enlarged partial cross sectional view of the welding electrodes as seen in the direction of the arrows 4—4 of Figure 3; and Figure 5 is a cross sectional view of the welding electrodes as seen in the direction of the arrows 5—5 of Figure 4.

The apparatus in which the principles of the present invention are shown for purposes of illustration comprises mechanism for continuously forming longitudinally welded tubing from metal strip material; the invention and the principles thereof are primarily adapted for use with apparatus of this character. However, it is to be understood that the principles and certain features of this invention may be used with apparatus of other kinds and for other purposes.

Figure 1:
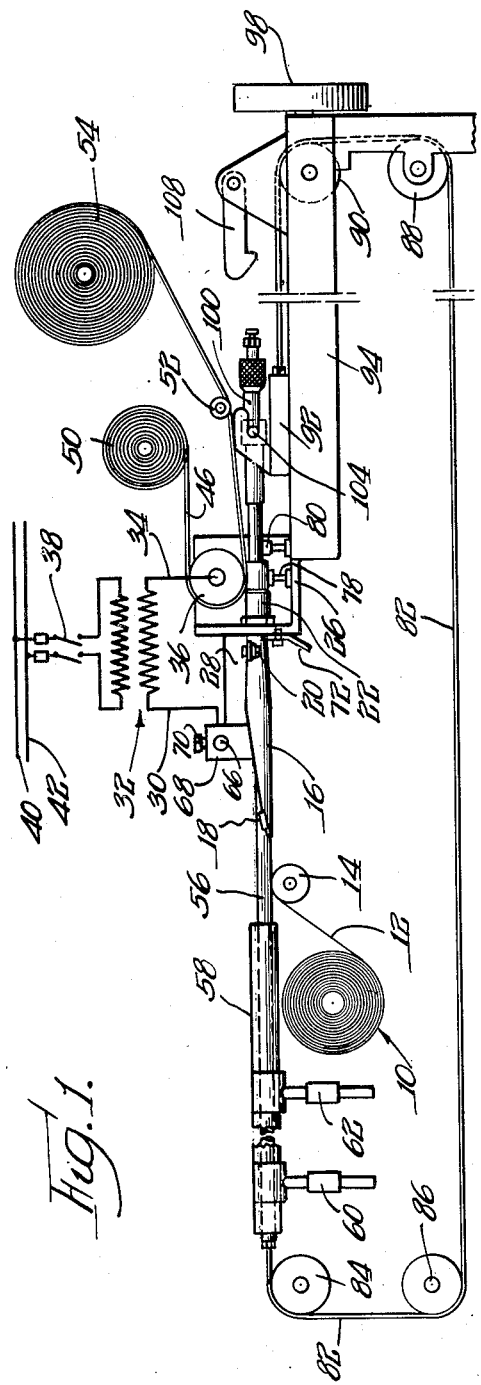
Figure 1 is a side view, in part shown diagrammatically, of a welding apparatus embodying the principles of the present invention.
Figure 2:
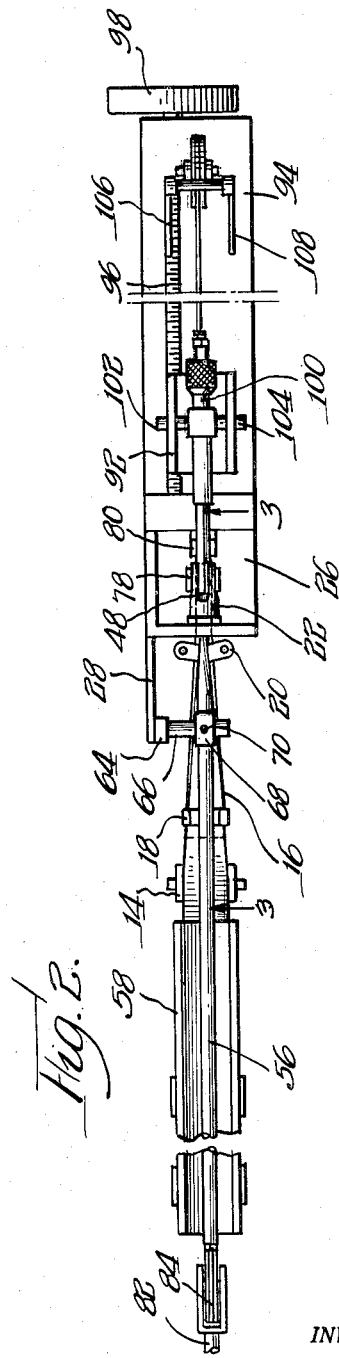
Figure 2 is a plan view of the apparatus shown in Figure 1 with certain portions thereof broken away.

Referring to the drawings and first to Figures 1 and 2 thereof, it will be seen that the apparatus illustrated comprises a roll 10 which serves as a source of supply of the strip metal 12 from which the tubing is to be formed. The metal strip 12 is led from the roll 10 over a guide roller 14 into a tube forming die 16. This die is in the form of an elongated trough. The leading end of the trough into which the strip material is fed, shown to the left in Figures 1, 2, and 3, is relatively flat and is provided with a cross piece 18 for insuring that the strip material 12 will be properly fed into the forming die 16 and held therein. The die member 16 is progressively shaped into the form of a trough from its leading to its trailing end. The sides of the trough are made of progressively increasing height and are then closed together at the top so that the trailing end of the die 16, shown to the right in Figures 1, 2, and 3, has a closed substantially circular form. The forming member is provided adjacent its trailing end with a pair of guide pieces 20 having their adjacent ends projecting beyond the edges of the forming member whereby to engage the edges of the metal strip 12 and hold them in proper position.

As best shown in Figure 3, the trailing end of the die 16 terminates in the cylindrical bore of a bushing member 22 threaded into a holder or plug member 24 which is in turn secured to a main bracket or support 26. The bracket 26 is secured to and electrically connected with a support plate 28 which is electrically connected to one branch 30 of the welding transformer diagrammatically indicated at 32. The other branch 34 of the welding transformer 32 is connected to an electrode wheel 36 rotatably supported adjacent the bracket 26 but electrically insulated therefrom. The welding transformer may be controlled from a switch 38 suitably connected to power lines 40 and 42.

As may be best seen in Figure 4, the electrode wheel 36 has formed on its periphery a semi-circular groove 44 which is adapted to receive an electrode element 46 which is generally circular in cross section and which may be in the form of a length of conducting wire. The wheel 36 urges the electrode wire 46 into contact with the strip or tube to be welded through an opening 48 in the bushing 22 as best shown in Figures 3, 4, and 5. The electrode wire 46 is supplied from a roll 50 and is pulled over the electrode wheel 36 by the movement of the tube being welded. From the electrode wheel 36 the electrode wire 46 passes over a guide roller 52 and onto a rewinding reel 54 which is driven at an appropriate rate by a mechanism not shown. The electrode wire 46 may be arranged in the form of a closed loop if desired.

A movable electrode 56 in the form of an elongated tube lies within the forming trough 16 in such a position that the tubing strip 12 will be wrapped around it as it is formed into tubing shape. The diameter of the electrode 56 is slightly less than that of the tubing to be formed as may be best seen in Figure 4. The trailing end of the electrode 56, shown to the left in Figures 1 and 2, is adapted to be supported by a support table 58 which, as will be best seen in Figure 2, is sufficiently wide to support electrodes of various sizes as may be used in the welding of different sizes of tubing. The support 58 is adjustable as to height by means of the adjustable supporting legs 60 and 62.

Means is provided for feeding electrical current to the electrode 56 from the support plate 28. For this purpose the support plate 28 carries a bracket 64 which may be adjustable longitudinally with respect to the support plate. The bracket 64 is provided with a shaft portion 66 which is adapted to carry an electrode engaging shoe 68 which is adjustably secured to the shaft 66 by any suitable means such as a set screw 70. As may be best seen in Figures 2 and 3, the shoe 68 slidably engages electrode 56 through the top of the forming die 16 and between the edges of the partially formed tube. The lower portion of the shoe 68 is provided with a contour which is complementary to that of the electrode 56 so as to provide a maximum surface of contact between these parts. If desired, the bracket 64 may be made vertically adjustable with respect to the plate 28 to permit vertical adjustment between the shoe 68 and the electrode 56.

The plug member 24 has attached thereto an adjustment lever 72, the upper end of which lever engages the opposite sides of the forming die 16. The lever 72 may be adjustably pivoted to move the trailing edge of the forming die 16, thus insuring that the overlapping edges 74 and 76 (see Figure 4) of the tubing strip will be properly positioned beneath the electrode wire 46. The support bracket 26 also carries a supporting member 78 for supporting the bushing 22 and a second adjustable support 80 for slidingly supporting the welded tube.

Means is provided for moving the inner electrode 56 to the right as seen in Figures 1, 2, and 3 with the tube strip 12 during the forming and welding operations and for returning the electrode 56 after the completion of these operations. The left-hand end of electrode 56 is adapted to be secured to a cable 82 by means of any suitable connection. The cable 82 passes over a set of wheels 84, 86, 88, and 90. The other end of the cable is secured to a sled member 92 which is arranged for sliding movement along a frame 94. The sled 92 is adapted to be moved along the frame 94 by means of a lead screw 96 with which it is in threaded engagement. The lead screw 96 is rotated in any suitable manner such as by means of an operating wheel 98 which may be manually operated or power driven.

The forward end of the tube strip 12 is adapted to be locked in a suitable clamping and holding device 100 which is secured to the sled 92. The inner electrode 56 is also connected to the clamping device 100. When the sled 92 is moved to the right by turning the operating wheel 98, the tube strip 12 and the inner electrode 56 are also moved to the right. Since the electrode wheel 36 firmly presses the electrode wire 46 against the outer wall of the formed tube, the electrode wire 46 will be moved with the tube and electrode 56, continuously pulling electrode wire from the supply roll 50 and passing it over and then under the electrode wheel 36. The operating wheel 98 and the electrode wire take-up reel 54 are suitably interconnected to cause the take-up reel 54 to continuously wind the electrode wire 46 after it has passed under the electrode wheel 36.

In the operation of the machine the lead screw 96 is operated to pull the sled 92 to the extreme left position as seen in Figures 1 and 2. Movement of the sled 92 to the leftmost position simultaneously moves the inner electrode 56 to its extreme left position by means of the interconnecting cable 82. The free end of the metal strip 12 is passed from the supply roll 10 over the guide roll 14 through the forming die 16 and is connected to the clamping device 100. Switch 38 is then closed and the sled 92 moved to the right by operating the wheel 98. This causes the metal strip 12 to be drawn from the supply roll 10 over the guide roll 14 and through the forming die 16 and bushing 22 whereby it is shaped into tubing form with its upper edges 74 and 76 overlapping as shown in Figure 4. As the tubing is drawn past the welding station, it is engaged by the electrode wire 46 which is urged against the joint by the electrode wheel 36. The welding current passes through the joint to be welded between the electrode wire 46 and the inner electrode 56. The inner electrode 56 is in electrical communication with the plate 28 through the shoe member 68 and its associated bracket assembly. The electrode 56 and the electrode wire 46 are drawn to the right with the tubing so that there is no sliding movement between these electrodes and the tubing. When the sled 92 reaches its extreme movement to the right a pair of shafts 102 and 104 which are attached to the clamping device 100 will be gripped by a set of latches 106, 108 thus holding the welded tubing against reverse movement. The inner electrode 56 is withdrawn to the left from the welded tube. If desired, means can be provided to cause the calibration and straightening of the tubing during the withdrawal of the electrode 56. The completed tubing section is then cut off and the new tubing end secured to the clamping device 100. During the welding process the welding station may be subjected to the action of cooling water as is usual in electrical resistance welding.

The electrode wire 46 is continuously supplied from the supply roll 50 during the welding operation. A new and perfectly formed electrode face is therefore always presented to the seam being welded. The area of contact between the electrode wire 46 and the joint is readily controlled by the pressure exerted upon it by the electrode wheel 36. The controlled area of contact in turn assures a controlled and constant pressure against the joint being welded. A constant and controlled area and pressure between the joint being welded and the electrode face produces a uniform current density at the point of weld and thus produces a high quality of work. The electrodes heretofore used in the art changed the contour of the welding face under the influence of pressure exerted by the welding wheel and the heat produced by the welding current. This change in contour of the electrode face is pratically troublesome when a narrow weld is made on thin material. Changes in the shape of the electrode face cause a change in current density at the point of weld producing an unsatisfactory weld. This can be compensated for by a constant adjustment of the welding current as the electrode face changes its contour in operation, but changing the welding current is a difficult and generally unsatisfactory method of controlling the quality of the weld. After a period of operation electrode wheels known in the art require a reshaping or dressing of the electrode face if good welds are to be obtained. The electrode face of the present invention does not require dressing since a new electrode face is continuously presented to the seam to be welded.

The electrode wire 46 may be used once or several times depending upon the amount of wear received. The present electrode structure is very economical in that when the wire becomes worn it may be redrawn and used again by adjusting the welding current or it may be used for other purposes.

During each welding operation a new and cool surface of the inner electrode 56 and the electrode wire 46 are continuously presented adjacent the point to be welded, thus reducing electrode wear. The electrode wire 46 and the inner electrode 56 are preferably made of copper or bronze or other material of good electrical conductivity. The bracket 26, bushing 22 and the supports 78 and 80 may also be of copper or electrically conductive metal thus forming further sources of current supply to the inner electrodes. These sources, however, are only secondary sources of supply since this current must pass through the tubing 12 in which the metal is not highly conductive. The primary supply source comprising the shoe 68 insures adequate current supply and a good weld.

The welding roller 36 may be spring pressed or hydraulically pressed into engagement with the welded joint at any desired pressure. This force is absorbed by the supports 78 and 80 which may be properly adjusted to absorb the force in any desired ratio.

The above described welding apparatus and electrode may be successfully used to weld stainless steel tubing and is particularly adaptable for welding extremely thin wall tubing. By changing the contour of the inner electrode 56 and the electrode wire 46 and associated parts tubing of oval contour or other desired contour may be produced.

It is obvious that various changes may be made in the specific embodiment of the invention set forth for purposes of illustration without departing from the spirit of the invention. The invention is accordingly not to be limited to the specific embodiments illustrated and described, but only as indicated in the following claims.

The invention is hereby claimed as follows:

1. The method of welding a metal tube from strip material by securing longitudinal juxtaposed edges thereof which comprises arranging an elongated cylindrical electrode in the tube, withdrawing an elongated filament electrode from a supply reservoir, engaging the outer surface of the tube to be welded against said filament electrode at a welding station, moving the tube and the elongated cylindrical electrode in a rectilinear path as a unit through said welding station with the filament electrode in engagement with the tubing, while passing current between the electrodes and while continuously pressing said filament electrode against said tube as the tube parts to be welded reach the welding station, and thereafter removing said filament electrode from contact with said tube.

2. The method of welding a metal tube as defined in claim 1, wherein the filament electrode is removed from contact with the tube while the cylindrical electrode remains therein.

3. The method of welding a metal tube as defined in claim 1, wherein the filament electrode is accumulated into an exhaust reservoir continuously as it is removed from contact with the tube.

4. The method of welding a metal tube as defined in claim 1, wherein the strip material is continuously shaped into tubing form around the cylindrical electrode in connection with the welding operation, and prior to the engagement of the elongated filament electrode against the tube surface.

5. A tube welding apparatus for welding the longitudinal juxtaposed edges of metal strip material to form a metal tube, said apparatus comprising an elongated cylindrical electrode adapted to be embraced within the tube, a supply reservoir for an elongated filament electrode, means for withdrawing the elongated filament electrode continuously from the supply reservoir and for engaging it onto the outer surface of the tube to be welded at a welding station, means for moving the tube and the elongated cylindrical electrode in a rectilinear path as a unit through said welding station with the filament electrode in engagement with the tubing, means for passing current between the electrodes, means for continuously pressing the filament electrode against the tube as the tube parts to be welded reach the welding station, and means for removing the filament electrode from contact with the said tube.

6. A tube welding apparatus as defined in claim 5, wherein said supply reservoir comprises means for supporting a reel of said elongated filament electrode, from which the electrode may be continuously withdrawn.

7. A tube welding apparatus as defined in claim 5, wherein said elongated cylindrical electrode comprises a metal tube, the outer surface of which is substantially commensurate in size with the inner surface of the tubing to be formed.

8. A tube welding apparatus as defined in claim 5, wherein means is provided for forming the strip material into tubing shape and around the cylindrical electrode as the strip material is fed to the welding station, said means comprising a forming trough.

9. A tube welding apparatus as defined in claim 5, wherein the moving means for the tube and elongated cylindrical electrode comprises a reciprocable feeding member adapted to grip the tube and electrode and propel them as a unit in a rectilinear path.

10. A tube welding apparatus as defined in claim 5, wherein the pressing means for the filament electrode comprises a rotatable wheel having pressure engagement with the tube and rotatably propelled by the movement thereof, the filament electrode being engageable with a portion of the peripheral surface of said wheel.

RAYMOND C. ANDERSEN.

REFERENCES CITED

The following references are of record in the file of this patent:

UNITED STATES PATENTS

| Number | Name | Date |
|---|---|---|
| 1,267,400 | Gravell | May 28, 1918 |
| 2,200,887 | Lockwood | May 14, 1940 |
| 2,262,423 | Dreyer | Nov. 11, 1941 |